Sept. 21, 1965   J. E. SHOCKROO ETAL   3,207,980
APPARATUS INCLUDING AN AUTOMATIC BALANCING BRIDGE FOR
MEASURING THE TEMPERATURE OF MOTOR WINDINGS AND
THE LIKE, INCLUDING THERMALLY CONTROLLED
BALLAST RESISTANCE MEANS Filed March 29, 1960                              2 Sheets-Sheet 1

James E. Shockroo,
Abraham P. White,
Inventors.
Koenig and Pope,
Attorneys.

James E. Shockroo,
Abraham P. White,
Inventors.
Koenig and Pope,
Attorneys.

United States Patent Office 3,207,980
Patented Sept. 21, 1965

1

3,207,980
APPARATUS INCLUDING AN AUTOMATIC BALANCING BRIDGE FOR MEASURING THE TEMPERATURE OF MOTOR WINDINGS AND THE LIKE, INCLUDING THERMALLY CONTROLLED BALLAST RESISTANCE MEANS
James E. Shockroo, Norton, and Abraham P. White, Attleboro, Mass., assignors to Texas Instruments Incorporated, Dallas, Tex., a corporation of Delaware
Filed Mar. 29, 1960, Ser. No. 18,275
22 Claims. (Cl. 324—62)

This invention relates to a fast-response resistance-change type of temperature-measuring apparatus for electrically conductive devices, such as electrical windings and the like, and with regard to certain more specific features, to such means for measuring rapidly changing motor winding temperatures.

Among the several objects of the invention may be noted the provision of means for accurately, rapidly, and reproducibly measuring and recording rapidly changing winding temperatures by the resistance method; the provision of means of the class described adapted to avoid the necessity for an operator of the apparatus to take resistance and time readings and draw plots thereof; the provision of means of the class described adapted after cut-off of an exciting circuit of a winding, to measure and record temperatures before the winding temperature falls off to any appreciable degree but after transient voltages due to switching, which switching voltages include those temporary transient voltages remaining after switching, have dissipated; and the provision of automatic means of this class which is particularly useful for the measurement and recording of cyclic motor winding temperature variations under locked rotor conditions of motors which are protected and under control of motor protective apparatus, whereby more accurate and complete information may be obtained for more effectively designing such protective apparatus. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

Figure 1:
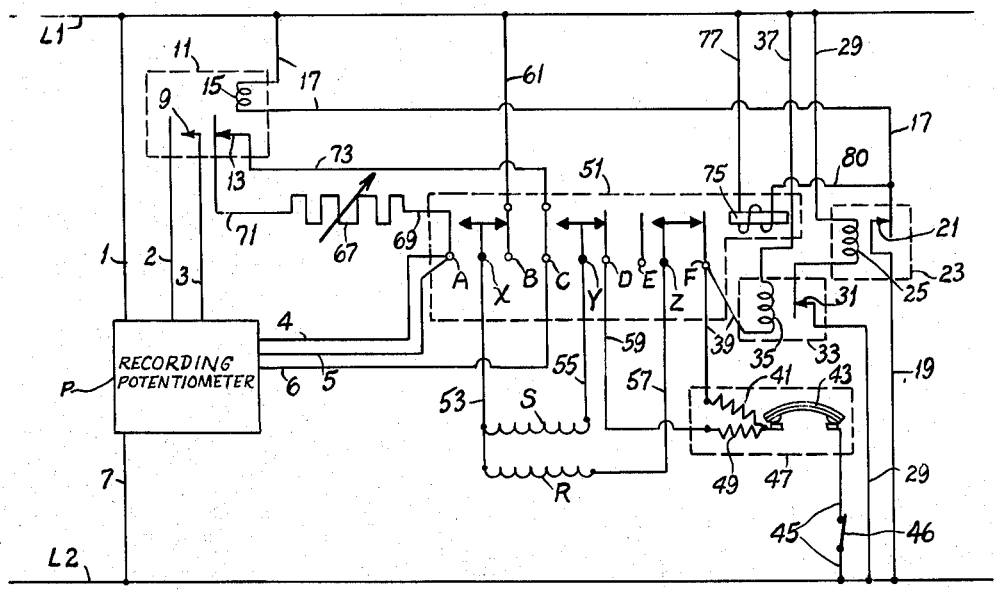
Figure 2:
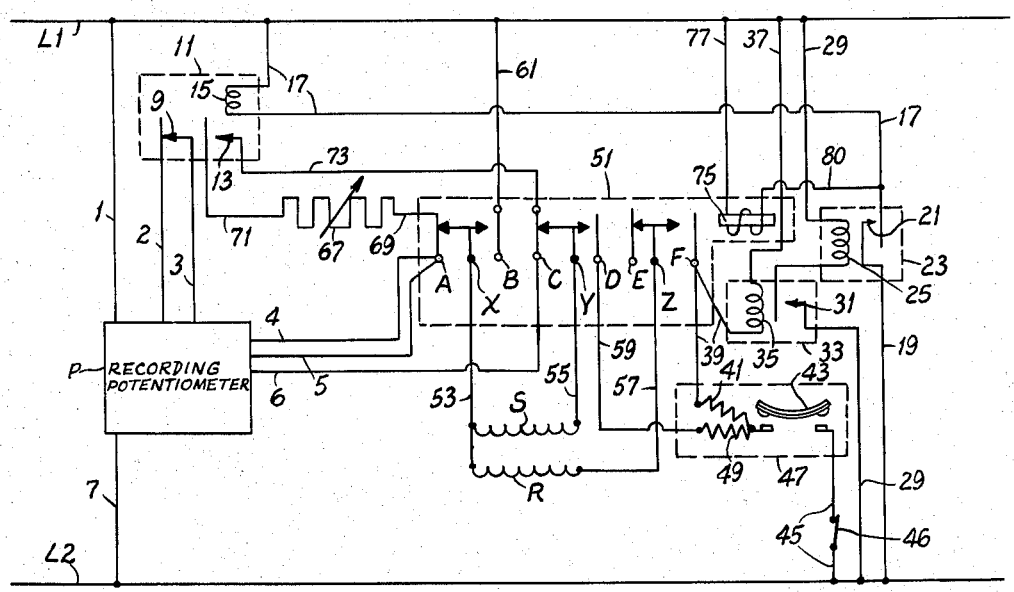
Figure 3:
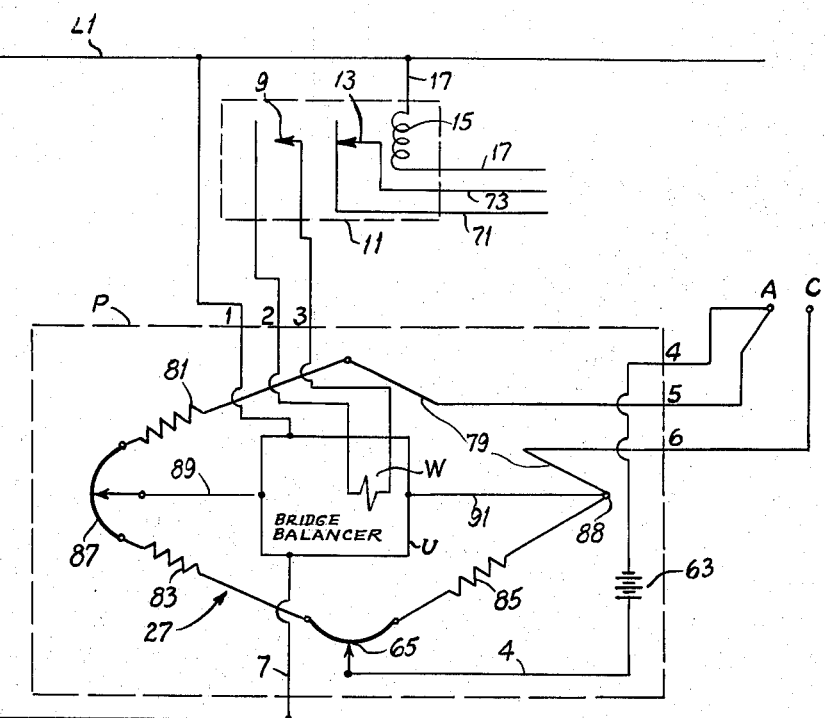
Figure 4:
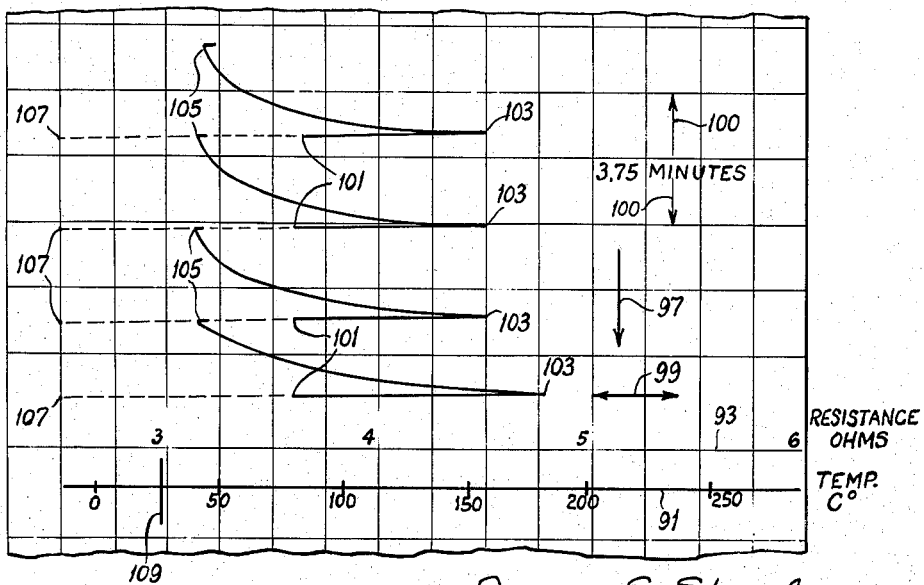

In the accompanying drawings, in which one of various possible embodiments of the invention is illustrated, FIGS. 1 and 2 are wiring diagrams illustrating the invention applied to determine temperatures of certain windings of a motor under locked rotor conditions; the former figure showing conditions according to a normally closed circuit established by a motor protector, and the latter figure showing conditions established by an open-circuit position of said protector;

FIG. 3 is a wiring diagram of certain portions of a conventional automatic balancing and recording Wheatstone resistance bridge device equipped with a pen-lift mechanism; and FIG. 4 illustrates a typical record produced on said recording device when used in a circuit according to FIGS. 1 and 2.

Corresponding reference characters indicate corresponding parts throughout the several views of the drawings.

It has heretofore not been possible with any degree of reproducible accuracy by the resistance-rise method to make temperature measurements of coils, the temperatures of which are varying rapidly. A typical, but not the only, example of such rapidly changing conditions would be temperature changes occurring in the winding of a motor whose rotor is locked and the energization of which winding may be manually or automatically controlled for example by thermal protective apparatus. It is to be understood, however, that the invention is not restricted to temperature measurements of motor windings but may be employed for temperature measurements of solenoid coils, transformer windings or other electrical windings or like elements wherein the temperature changes.

The invention eliminates the human error that heretofore was inherent in obtaining time and temperature measurements and which resulted in non-reproducible data required for arriving at accurate results. As a consequence of the more accurate information that can be obtained by the use of the invention, motor protectors and the like may be designed with greater efficiency.

Referring now more particularly to FIGS. 1 and 2 of the drawings, L1 and L2 indicate the sides of a power circuit, for example a 60-cycle, 117-volt power circuit. Leads 1 and 7 from the power circuit are connected to a conventional automatic D.C. resistance bridge balancing an automatic recording device P. An example of a suitable commercial resistance bridge device P for the purpose is known in the electrical trade as the Leeds and Northrup Type G bridge, sold under the trademark Speed-O-Max, portions of which are shown in FIG. 3. This bridge includes a conventional pen-lift attachment which may be excited and deexcited over scriber circuit lines 2 and 3 under control of a scriber control switch 9. The type G bridge is available in various fast balancing models, for example with a one-second full-scale deflection of its recording pen. The pen of attachment W (see FIG. 3) is normally biased to a lift position and is pulled down into marking position by closing circuit 2, 3 at switch 9. Switch 9 is part of a relay 11. The relay 11 also includes a ballast or dummy resistance control switch 13 and an operating coil 15. Coil 15 is connected across the line L1, L2 by lines 17 and 19, containing a switch 21 of another relay 23. The operating coil 25 of relay 23 is connected across the lines L1, L2 by lines 29 containing a switch 31. Switch 31 is in a relay 33, the operating coil 35 of which is connected to side L1 of the line by lead 37. Its other end is connected to side L2 of the line through leads 39, a heater 41, a thermostatic snap-acting control switch 43 and line 45, in which may be a manually operable on-off switch 46. Heater 41 of thermostatic control switch 43 forms part of thermostatic motor winding protector 47, which also contains a second heater 49. Relays 11 and 23 are each of the time-delay type. Relay 33 is effective to isolate the time delay circuit (which includes time-delay relay 23) from the current and voltage of the motor circuit so that the same relay 23 having a particular coil voltage rating can be employed over widely varying motor test voltage conditions. It should be understood, however, that if it is desired to provide different coil voltage rating relays 23 to match varying motor test voltage conditions, that in this situation relay 33 could be omitted, if desired.

At numeral 51 is shown a three-pole, double-throw magnetic relay, the contacts of which are shown at A, B, C, D, E, F and the poles of which are shown at X, Y, Z. Poles X and Y are connected to opposite ends of a motor start winding S by lines 53 and 55. Poles X and Z are connected to opposite ends of a motor run winding R by lines 53 and 57.

Heater 49 is connected with relay terminal D through line 59. Terminal E is dead-ended. Terminal B is connected to line side L1 by lead 61. Terminal A has a connection 4 through a source of D.C. potential or battery 63 with a connection 65 to the bridge P (see FIG. 3). Terminals A and C are connected through leads 5 and 6, respectively, into one leg of said bridge circuit for the purpose of connecting therein either an adjustable dummy or ballast resistance 67 (FIGS. 1 and 2) and/or the winding S, the temperature of which winding S is to be obtained. The dummy or ballast resistance 67 is connected across terminals A and C through lines 69, 71, 73 and switch 13.

The switch arms of poles X, Y and Z of the magnetic relay 51 (shown by darts) are operated by an electromagnet 75, connected with line L1 through line 77 and through line 80 with the line 17. The contacts of relay 51 in the D.C. resistance measuring circuit, i.e. A–X, C–Y and E–Z, are selected or plated so as to maintain minimum and substantially uniform contact resistance, as for example by gold plating.

Referring now more particularly to FIG. 3, the recorder P includes the bridge circuit shown in general at 27, in one arm 79 of which the dummy or ballast resistance 67 and/or the start winding S may be connected across contacts A and C. The range of adjustments of resistance 67 extends beyond that of the resistance of any motor winding expected to be tested, so that this resistance 67 may be matched by adjustment. The other three arms of the bridge are formed by resistances 81, 83 and 85 and by parts of the adjustable corner connections 65 and 87 therebetween. One corner 87 of the bridge is connected through lead 89 with a standard signal-receiving and automatic D.C. bridge-balancing assembly indexed U. Another corner 88 of the bridge circuit is joined to assembly U through a connection 91. The assembly U in the usual manner includes a moving recording paper tape illustrated in FIG. 4, automatic means for continuously balancing the bridge circuit in response to any unbalancing signals received in arm 79, and a lift type of recorder pen scriber attachment W which moves across the tape in response to bridge-balancing movements and which makes a trace when dropped.

Since each of the time-delay relays 11 and 21 is of the time-delay type and will operate with such time delay when de-energized, operation is as follows:

The circuit as shown in FIG. 1 is shown with all switches and relays in position for energizing the motor windings S and R, the protector 47 of which has its thermostatic protector switch 43 closed. They assume said positions when switch 46 is closed. Temperature-resistance readings of the start winding S are to be obtained. At this time the bridge 27 (FIG. 3) is connected with the ballast resistance 67 so that the scriber of the pen unit W will remain on scale, although raised to avoid marking on the strip chart. Thus although the scriber pen does not make a trace, it is free to move as determined by the bridge-balancing mechanism with which it is operatively associated in the usual way. The direction of movement is as indicated by the dart 99 in FIG. 4.

Tripping open of the thermal protector 47 (FIG. 2) upon motor overheating simultaneously de-energizes the motor windings S and R and opens switch 31 of relay 33. Opening of switch 31 opens switch 21 of time-delay relay 23. On expiration of the delay, which is only long enough for any transient voltage caused by opening of the motor circuit to be dissipated, the magnetic relay 51 becomes de-energized and moves to its FIG. 2 position, and at the same time coil 15 of the time-delay relay 11 is de-energized. Magnetic relay 51 switches the motor winding to be measured (in this case winding S) to the bridge circuit through contacts A and C. During the time delay for operation of relay 11 (i.e., to open switch 13 and close switch 9), the motor winding S is in parallel with the ballast resistance 67 in the arm 79 of the bridge 27. Hence the value of the resistance on the bridge will be less than that of either resistance 67 or of the winding S. This assures that the lifted pen in mechanism W will be at a minimum starting position on the scale, such as shown at 107 in FIG. 4. Then the time-delay relay 11 operates to close switch 9, which draws the scriber pen in assembly U toward marking position on the chart and opens switch 13, as shown in FIGS. 2 and 4. Thus the ballast resistance 67 is removed from the bridge circuit, leaving the winding S therein. The increased resistance, accompanied by automatic rebalancing of the bridge, sends the pen of W upward on the chart along the dotted line 107–101. At 101 it drops to its writing position. The device U then instantaneously records the winding resistance at peak 103 with a sharply defined upscale trace, and continues its recording of winding resistance to point 105 as the winding cools and until the thermal protector 47 resets to re-energize the motor for another heating cycle (FIG. 1). The process repeats itself indefinitely, as illustrated by the four traces shown on FIG. 4.

Approximate settings for the time delays are 400 milliseconds for time-delay relay 23 and 100-milliseconds for time-delay relay 11, which in the case of a start-winding test for a ⅓ h.p., 115 volt split-phase motor records peak instantaneous resistance value in somewhat over ½ second by an amount of time required for bridge 27 to balance after shutdown caused by opening of switch 43. Advance of the chart paper in 3.75 minutes is indicated by arrows 100.

FIG. 4 has been drawn from actual recorder tape taken from a recorder assembly U, connected to function in accordance with the invention, temperature and resistance conversion scales 91 and 93, respectively, being shown at the bottom of the figure. The paper will be understood to be traveling in the direction shown by the arrow 97. The movements of pen marker W, which accord to the bridge-balancing actions of the assembly U, are in the reciprocating directions of the dart 99.

From the above, it will be seen that the pen while lifted moves downscale to 107 whenever the resistance 67 and winding S are in parallel in the arm 79 of the bridge. The points 101 are those at which the pen marker drops to the paper as resistance 67 is taken out of the bridge circuit, the increased resistance of winding S to be measured being left in the bridge circuit. Each trace portion 101–103 indicates rapid rise in the resistance value up to peak value 103. Each peak value at 103 is registered close to the time that the current in winding S is cut off by opening of switch 43, time enough being allowed by the time delay in relay 23 to permit transient A.C. current in windings R and S to disappear and by time delay in relay 11 in removing resistance 67 from the bridge, the latter time delay being for the purpose of allowing the lifted scriber to return to a low scale position such as 107 on the chart. The trace portions 103–105 indicate cooling functions from peak values 103. Each point 107 indicates an initial lifted position of the marker W at a sufficient downscale point on the temperature scale to assure that the scriber will thereafter drop to the chart on its upward swing 107–103, rather than on a downscale swing 103–105, for otherwise marking of the peak point 103 would not occur and accuracy would be diminished. It will be understood that while the peak point 103 does not exactly represent the temperature of winding S at the time of opening of switch 43, nevertheless it does so extremely closely, since the stated time-delay functions are very small, as already made clear. Line 109 indicates the cold resistance of the motor winding S.

Advantages of the invention are as follows:

(1) The circuit provides means for making a resistance reading in a fast enough time after shutdown of current to the winding such as S that the temperature to be determined has not had an opportunity to fall off any appreciable amount.

(2) The use of the automatic self-balancing resistance-recording bridge available in the market avoids the need for hand-balancing a bridge, which has heretofore been the cause of the inability to obtain reproducible results caused by the slowness and unreliability of the human element in rapidly making adjustments and taking readings. Moreover, recording bridges are available requiring only about a second to assume a balanced condition, thus enabling resistances and hence temperatures in the coil being measured to be closely followed.

(3) The time-delay action of relay 23 keeps the motor winding S off the bridge circuit for a sufficient time that transient voltages disappear before the test winding S is placed in the bridge circuit in parallel with resistance 67. This affords accurate recordings which are not influenced by the transient voltages.

(4) The time-delay action of relay 11 affords sufficient time for proper positioning of the pen of attachment W to reach a proper or desired downscale position on the strip chart (such as shown in FIG. 4) before switching out the dummy resistance 67 to initiate testing of the winding S so as to assure a well-defined temperature reading (i.e. beginning at point 103).

(5) The accurate information obtained by means of the invention and as indicated in FIG. 4 provides data for better correlating motor protective functions of protectors such as 47 with the protective requirements of the motor thus affording means for better designing the former.

(6) Another feature to be noted is that the motor winding S is responsive to the power from the A.C. circuit L1 and L2 during heating, but that when switched out of this circuit after heating, its resistance and consequently its temperature is sensitively measured by sending direct current through it from the battery 63.

(7) The ballast resistance 67 keeps the bridge recording pen at a desired position on scale during the time that the motor winding S is energized and heating and while it is not connected in the bridge circuit.

(8) The former need to take readings of resistance and time after shutdown, drawing a curve of resistance versus time and extrapolating back to zero time, is avoided by the instant invention.

It will be apparent that if the temperature of the run winding R, instead of that of start winding S, is to be recorded, lines 6 and 73 would be moved from terminal C to terminal E and terminal C would then be deadended.

While the invention has been described in connection with a winding having a rapid temperature change, it will be understood that it is applicable to windings in which temperature change is slow.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A circuit for actuating the bridge of an automatic balancing Wheatstone resistance bridge recorder mechanism to measure and record temperature-induced resistance changes in a conductive element; comprising a ballast resistance circuit containing a ballast switch, an excitation circuit for said conductive element, a relay switch having contacts in an arm of said resistance bridge adapted to connect said excitation circuit into said bridge arm, first and second relays, the second one of which is adapted to operate said ballast switch and the first one of which is adapted to operate said second relay and said relay switch, a control circuit adapted to excite said excitation circuit and having a control switch therein, said control circuit when closed by its control switch being adapted through said excitation circuit to excite said conductive element to heat it and through said relays to place said ballast circuit in said bridge arm, said control circuit upon opening of its said control switch being adapted to de-excite said excitation circuit of the conductive element and through said relays first to insert said de-excited excitation circuit in parallel with said ballast circuit in said bridge arm and thereafter to open said ballast switch to remove the ballast circuit from said bridge arm.

2. A circuit according to claim 1, wherein said control switch is of the thermostatic automatically opening and closing type.

3. A circuit according to claim 2, including relay means controlled by said control switch and adapted to operate said first relay.

4. A circuit for actuating the bridge of an automatic balancing Wheatstone resistance bridge recorder mechanism including an electrically controlled scriber to measure and record temperature-induced resistance changes in a conductive element; comprising a scriber circuit containing a scriber switch, a ballast resistance circuit containing a ballast switch, an excitation circuit for said conductive element, a relay switch having contacts in an arm of said resistance bridge adapted to connect said excitation circuit into said bridge arm in parallel with said ballast resistance circuit, first and second time-delay relays, the second one of which time-delay relays is adapted to operate said ballast switch and said scriber switch and the first one of which is adapted to operate said second time-delay relay and said relay switch, a control circuit adapted to excite said excitation circuit and having a control switch therein, said control circuit when closed by its control switch being adapted through said excitation circuit to excite said conductive element to heat it and at the same time to actuate said time-delay relays to operate the scriber switch and the ballast switch to lift the scriber and to place said ballast circuit alone in the said bridge arm, said control circuit upon opening of its said control switch being adapted to de-excite said excitation circuit and to operate said first time-delay relay first to set said relay switch to insert said de-excited excitation circuit in parallel with said ballast circuit in said bridge arm, said first time-delay switch with time delay actuating said second time-delay switch, said second time-delay switch with time delay being adapted to open said ballast switch to remove the ballast circuit from said bridge arm and to actuate said scriber switch to cause said scriber circuit to move the scriber into recording position in said recorder mechanism.

5. A circuit according to claim 4, wherein said control switch is of the thermostatic automatically opening and closing type.

6. A circuit according to claim 5, including relay means controlled by said control switch and adapted to operate said first time-delay relay.

7. A circuit for actuating the D.C. bridge of an automatic balancing Wheatstone resistance bridge recorder mechanism containing an electrically operated scriber in order to measure and record temperature-induced resistance changes in a winding supplied with current through a normally closed thermostatic protector switch; comprising a scriber circuit containing a normally open switch, a ballast resistance circuit containing a normally closed ballast switch, an excitation circuit for said winding, a magnetic relay switch having contacts in an arm of said resistance bridge adapted to connect said excitation circuit in said bridge arm in parallel with said ballast resistance circuit and to disconnect said excitation circuit from said bridge arm, time-delay relays a second one of which is adapted with time delay to open said ballast switch and to close said scriber switch, and a first one of which time-delay relays operates said magnetic relay switch and which time-delay operates said second time-delay relay, a control circuit for said winding containing said protector switch, said control circuit when closed by said protector switch being adapted to excite said winding to heat it and to acutate said time-delay relays to place said ballast circuit in said bridge arm, said control circuit when opened by said protector switch being adapted to de-excite said excitation circuit and to actuate said first time-delay relay, said first time-delay relay adapted with time delay to set said relay switch to insert said de-excited excitation circuit in parallel with said ballast circuit in said bridge arm, said first time-delay switch with time delay also actuating said second time-delay switch, said second time-delay switch with additional time delay being adapted to open said ballast switch to remove the ballast circuit from said bridge arm and to actuate said scriber switch to cause said scriber circuit to position said scriber for recording in said recorder mechanism.

8. Resistance-change, winding, temperature-measuring apparatus, comprising means for switching a winding circuit containing the winding to be measured between an A.C. power line on the one hand and an arm of a D.C. bridge circuit of a continuous recorder device on the other hand and for switching a ballast circuit to and from said arm, said means comprising a ballast switch in said ballast circuit and a relay switch for the winding circuit, a pair of relays adapted for time-delay operation, a first one of which relays controls the operation of the second one thereof, the first relay when energized adapted to position said relay switch to connect said winding circuit to the power line and the second relay when energized adapted to place the ballast circuit in said arm, a control switch adapted when closed to energize the first relay and adapted to connect the excitation circuit to said power line, whereby also the second relay is energized by the first relay to insert the ballast circuit in said arm without the excitation circuit, said control switch when open adapted to de-energize the first relay which with time delay actuates said relay switch to insert the excitation circuit in parallel connection with said ballast circuit in said arm, said second relay being operable from said first relay to open said ballast switch with time delay to remove the ballast circuit from said arm.

9. Resistance-change, winding temperature-measuring apparatus, comprising means for switching a winding circuit containing the winding to be measured between an A.C. power line and an arm of a D.C. bridge circuit of a recorder device including a scriber circuit and for switching a ballast circuit to and from said arm, comprising a ballast switch in said ballast circuit, a scriber switch in the scriber circuit, a relay switch for the winding circuit, fast-operating and time-delay operating relays a first one of which operates a second one thereof, the first relay when energized adapted to position said relay switch to connect said winding circuit to the power line and to operate the second relay, a control switch adapted when closed to energize the first relay and connect the excitation circuit with said power line, whereby also the second relay is energized by the first relay to close said ballast switch to insert the ballast circuit in said arm and to open the scriber switch to place the scriber in a non-recording position, said control switch when open adapted to disconnect the excitation circuit from the A.C. power line and to de-energize the first relay with time delay to actuate said relay switch to insert the excitation circuit in parallel connection with said ballast circuit in said arm of the D.C. bridge circuit, said second relay being operable from said first relay with time delay to open said ballast switch to remove the ballast circuit from said arm and to close said scriber switch to position the scriber for recording.

10. Apparatus according to claim 9, wherein said control switch is constituted by an automatically opening and closing thermostatic switch adapted to open in response to heating of the winding and to close in response to cooling thereof.

11. Resistance-change type temperature-measuring apparatus for an eletcrically conductive device, comprising recording means including a D.C. resistance bridge circuit, an A.C. power supply, an exciter circuit between said A.C. power supply and said device, a thermal protector switch in said A.C. exciter circuit, a ballast resistance, switch means adapted selectively to connect said ballast resistance and said device into said resistance bridge, and a relay circuit responsive to action of said thermal protector switch adapted to hold the ballast resistance on the bridge when the thermal protector switch is closed and with time delay to remove the device from the supply circuit and substitute it for said ballast resistance in the bridge when said thermal protector switch opens.

12. Apparatus made according to claim 11, wherein said relay circuit is of the time-delay type adapted to delay connection of the device into the resistance bridge when the protector switch opens until transient voltages disappear from the device.

13. Resistance-change temperature-measuring apparatus for an electrically conductive device comprising an A.C. source for supplying current to said device, means including a D.C. resistance bridge circuit for measuring the resistance of said device, a ballast resistance, switch means responsive to the temperature of said device for selectively connecting either said device or said ballast resistance into said D.C. bridge circuit, said switch means including means for interrupting the supply of current to said device and connecting said device into said D.C. resistance bridge circuit whenever the temperature of said device exceeds a preselected level, and means for indicating the rsistance of said device during times when said device is connected into said D.C. resistance bridge circuit.

14. Apparatus as set forth in claim 13 wherein said switch means includes means for delaying the connection of said device into said D.C. bridge circuit after the interruption of the supply of current to said device whereby transient voltages caused by the interruption of current through said device are dissipated prior to connection of said device into said bridge circuit.

15. Apparatus as set forth in claim 14 wherein said switch means further includes means for delaying the disconnection of said ballast resistance from said bridge circuit for an interval after said conductive device has been connected into said bridge circuit whereby said ballast resistance and said conductive device are concurrently connected into said bridge circuit for said interval.

16. Resistance-change temperature-measuring apparatus for an electrically conductive device comprising a source of electrical energy, switch means electrically interconnected between said source and said device, said switch means having a first condition wherein current is permitted to flow from said source through said device and a second condition wherein said current is interrupted, means including a resistance bridge circuit for measuring the resistance of said device, a ballast resistance, means operative when said switch means is in its first condition for connecting said ballast resistance in said bridge circuit, means responsive to actuation of said switch means from its first to its second condition for disconnecting said ballast resistance from said bridge circuit and connecting said electrically conductive device therein in its place, and means for indicating the resistance of said conductive device when the latter is connected in said bridge circuit.

17. Apparatus as set forth in claim 16 wherein said means for disconnecting said ballast resistance from said bridge circuit and connecting said electrically conductive device therein includes a time-delay relay for connecting said conductive device into said bridge circuit after a preselected interval following actuation of said switch means from its first to its second condition whereby transient voltages caused by the interruption of current through said device are dissipated prior to connection of said device into said bridge circuit.

18. Apparatus as set forth in claim 17 wherein said means for disconnecting said ballast resistance from said bridge circuit and connecting said electrically conductive device therein further includes a second time-delay relay for delaying the disconnection of said ballast resistance from said bridge circuit for a period of time after said conductive device has been connected into said bridge circuit whereby said ballast resistance and said conductive device are concurrently connected into said bridge circuit for said period.

19. Apparatus as set forth in claim 18 wherein said switch means includes a thermostatic switch responsive to the temperature of said device, said switch being actuated to its second condition in response to said temperature exceeding a preselected level.

20. Apparatus as set forth in claim 19 wherein said resistance bridge circuit is the self-balancing type and wherein said means for measuring the resistance of said deviec includes means for providing a record of said resistance.

21. Resistance-change temperature-measuring apparatus for an electrically conductive device comprising a source of energy for supplying current to said device, means for measuring the resistance of said device including a resistance bridge circuit, a ballast resistance normally connected into said bridge circuit, thermostatic switch means responsive to the temperature of said device for interrupting the supply of current to said device and connecting said device into said resistance bridge circuit in place of said ballast resistance whenever the temperature of said device exceeds a preselected level, and means responsive to said resistance measuring means for recording the resistance of said device when the latter is connected into said bridge circuit.

22. Resistance-change temperature-measruing apparatus for an electrically conductive device comprising a source of energy for supplying current to said device, means for measuring the resistance of said device including a resistance bridge circuit, a ballast resistance normally connected into said bridge circuit, switch means responsive to the amount of current supplied by said source for connecting said device into said bridge circuit and after a delay interval disconnecting said ballast resistance, said ballast resistance and said device being concurrently connected into said bridge for said interval, and means responsive to said resistance measuring means for recording the resistance of said device when the latter is connected into said bridge circuit.

References Cited by the Examiner
UNITED STATES PATENTS

| | | | |
|---|---|---|---|
| 1,460,530 | 7/23 | Brown et al. | 324—62 |
| 2,439,940 | 4/48 | Lewis | 324—54 |
| 2,446,474 | 8/48 | Harrold | 317—41 X |
| 2,671,874 | 3/54 | Friedrichs | 317—41 X |
| 2,772,395 | 11/56 | Runaldue et al. | 324—62 |
| 2,792,542 | 5/57 | Robinson | 324—100 X |
| 2,805,394 | 9/57 | Hermach | 324—104 X |
| 2,825,027 | 2/58 | Seely | 324—62 |
| 2,912,644 | 11/59 | Makous | 324—158 X |
| 2,989,738 | 6/61 | Taylor | 340—253 X |

OTHER REFERENCES

Kapp: Transformers, Sir Issac Pitman & Sons, Ltd., London, 1925, pp. 78 and 79.

Underhill: Coils and Magnet Wire, McGraw-Hill Book Co., Inc., New York, 1925, pp. 277–304.

WALTER L. CARLSON, *Primary Examiner.*

SAMUEL BERNSTEIN, *Examiner.*